United States Patent Office 3,516,438
Patented June 23, 1970

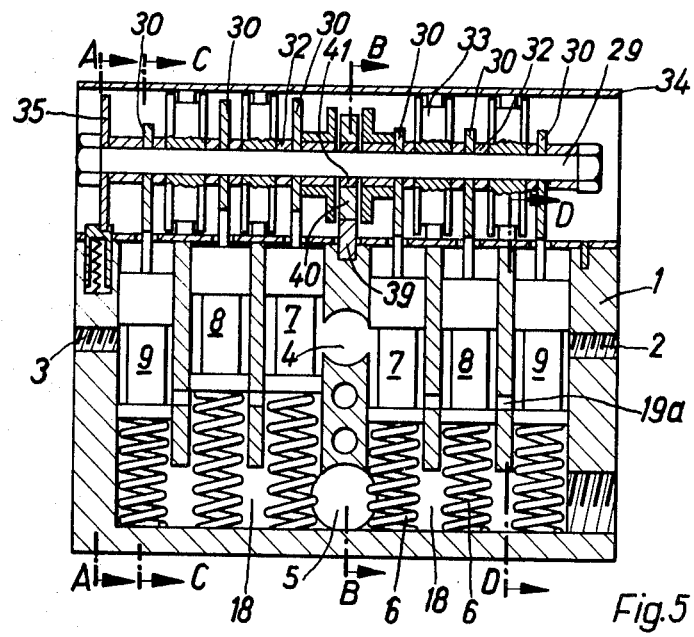
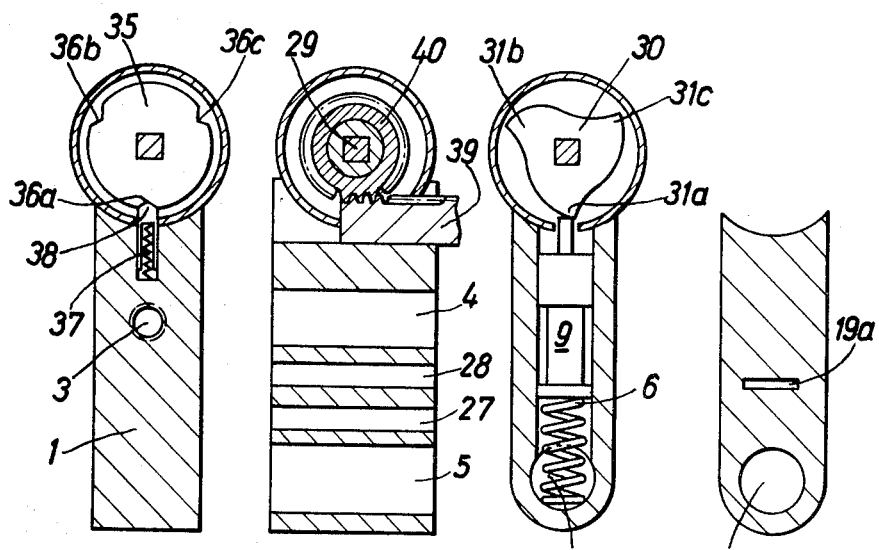

3,516,438
MULTI-WAY FLUID CONTROL VALVE
Maurus Glas, am Piusturm, Landshut, Germany
Filed Jan. 19, 1967, Ser. No. 610,384
Int. Cl. F16k 11/10, 11/07
U.S. Cl. 137—596
8 Claims

ABSTRACT OF THE DISCLOSURE

A multi-way fluid control valve has a valve body provided with a fluid inlet connection, a fluid return connection and at least one consumer connection, and defines a fluid flow path therein between the inlet connection and each consumer connection, each said fluid flow path to a consumer connection being controlled by two or three valve members arranged in separate valve chambers connected in series, and being independently movable between three respectively two operative positions said valve members being independently operable by means of an interchangeable cam arrangement disposed outside said valve body and arranged to operate said valve members against the action of an opposing force.

---

The present invention concerns a fluid control valve for use in hydraulically or pneumatically operated installations. Such control valves, generally referred to as "way/stage valves," have hitherto been individually produced in accordance with their specifically intended purpose, such considerations as the required number of connections, flow passage and position of the valve member within the valve body, pressure and kind of pressure medium, method of actuation and the like being taken into account in a vast number of constructionally differing structures. Thus, for example, an installation comprising only a pump and single-action consumer, depending upon the kind of consumer, requires a valve having two or three connections, whilst an installation having a double-acting consumer, inclusive of return connection, requires a valve with four connections. To accommodate these applications, the most varied flow passages may be required in the valve, for example, flow passages having an open or closed flow to the return vessel, passages for series connection with or without utilisation of the returning pressure medium, for parallel connection with or without open flow to the return vessel in zero position and so on. Moreover the shaping of such is also decisively determined by the requirement resulting from the pressure head and method of actuation. Thus, a large number of "valve programmes" have been introduced comprising a large number of individual components constructed different from one another, each individual valve of which being adapted only for the method of control of one "switching symbol" and the operational requirements corresponding to the momentary users having necessarily to be kept more or less completely in stock to permit them, if required, to be mutually interchanged of assembled to form control units.

To minimize these disadvantages attempts have been made to provide a uniform valve body capable of receiving interchangeable control pistons which, however, from a technical point of view encounters considerable difficulties. The use of a valve body conforming to all conditions for one flow valve premises that for its dimensioning and development the maximum groove slider size required is used as basis and which necessitates a correspondingly large dimensioning of the interchangeable control pistons, even in cases where the operation could be carried out with substantially smaller members. The extension or enlargement of the control pistons, however, makes their exchange substantially more difficult and expensive, so that this is not a practical solution to the problem. Control pistons require small tolerances and which, moreover, by maintaining small tolerances have to be worked in. Furthermore, increased length of control piston involves increased difficulties, more particularly when considering that the mutual wearing of sliding members during operation leaves specific points of wear which though, when retaining the members, has no adverse effect, may result in leaking pistons when a member is replaced and such leaks can never be completely eliminated even with careful working-in. Replacement of the highly tolerated control piston, thereof, requires such a high expenditure that this arrangement is impractical.

The object of the present invention is to provide a fluid control valve which at any time without difficulties and retaining the same valve body may be adjusted to any control programme without requiring the replacement of valve members machined to small tolerances and which are difficult to machine, more especially to be honed.

According to the present invention a multi-way fluid control valve having a valve body with a fluid inlet connection, a fluid return connection, and one or more consumer connections, is characterised by the feature that each fluid flow path within the valve body to a consumer connection is controlled by two or more valve members arranged in series, each valve member being independently operable by means of a cam disposed outside the valve body and arranged to operate the valve member against the action of an opposing force.

In one embodiment of the invention three valve members may be provided which are displaceable between two operating positions and of which the valve member controlling the outflow to the return connection is located in the centre. In this case the individual valve member may be formed either as a poppet valve or as grooved slider. When using poppet or seat valves, the central valve adapted as a two-way valve member preferably has an internal bore communicating the valve chamber with the return flow connection, whilst when using grooved sliders, the arrangement conveniently is such that the valve chamber of at least the central grooved slider leads into the return flow passage with the outer grooved sliders being so formed that their grooves in one operating position register with apertures communicating with the central valve chamber and with further apertures leading to the fluid supply connection or to the consumer connection whilst in the other operating position these grooves register with only the apertures leading to the fluid supply connection and to the consumer connection respectively.

In an alternative embodiment of the invention, when using grooved sliders as valve members, three sliders may be displaceable between two operating positions, or two sliders may be displaceable between three operating positions. In the latter case it is necessary to form two apertures communicating the two valve chambers and to use sliders each having two grooves in conjunction with suitably formed cam discs permitting three operating positions. One of these three operating positions permits the fluid inlet, fluid return and consumer connections to be mutually interconnected. However, where this mutual interconnection is not required it is sufficient to provide two valve members adapted to be displaced between only two operating positions. With such a valve arrangement, in contrast to the other embodiments described, it is not possible to obtain all possible operating combinations between the various connections.

The fluid supply connection and return connection are conveniently arranged in parallel relationship one above the other in a direction extending at right angles to the plane formed by the valve members, the fluid supply pipe communicating with the valve chamber located closest thereto and the return connection communicating with a return chamber of the central valve member. When using grooved sliders as valve members the fluid return connection communicating with a fluid collection chamber into which the valve chambers of all valve members lead.

Preferably a valve member arrangement is provided on both sides of the supply connection and fluid return connection, with which valve member arrangement any optional fluid conduction is permitted in accordance with the required intended use. For this purpose it is merely necessary to change or replace one or both of the cams controlling the individual valve members, which cams may be produced simply by stamping with sufficient accuracy and replacement of the cams therefore is neither difficult nor does it require difficult fitting and lapping efforts. The adaptation of the control edges relative to one another required in known valves which has to be carried out for each side of the consumer, i.e. for the inlet and return flow is abandoned like the longitudinal notching of the sliders required to obtain a fluid advance or slow-down for the purpose of avoiding pressure surges during operation. The ratio of register of each valve member is generally determined by the shape of the cam discs and their adjustment relative to one another. The parallel arrangement of the fluid inlet and return connections in a direction extending at right angles to plane of the valve members permits an optional member of individual valve bodies to be joined into large control units without necessitating any modification of the valve bodies or without having to provide additional connections.

Actuation of the valve members is effected preferably by means of a camshaft adapted to be interchangeably mounted outside the valve body and having mounted thereon a cam disc for each valve member, each cam disc having a number of cam surfaces corresponding to the number of valve positions, the cam disc also being rigidly braced relative to each other on the camshaft by the interposition of spacer sleeves on the shaft. In this way the control programme may be modified simply by replacing the camshaft. Alteration or replacement of the valve members is eliminated in this case, and the predetermination of a complete operating programme on a prefabricated camshaft reliably eliminates faulty controlling, for example, as a result of incorrect or inaccurate mounting of the cam discs. The camshaft is preferably also provided with an alignment disc having notches formed therein corresponding to the number of cam surfaces of each cam disc, the alignment disc being so arranged on the camshaft that its notches correspond with the line of action of the cam surfaces. The notches operationally engage with a spring-loaded locating pin arranged on the valve body. By means of this alignment disc the camshaft may be reliably arrested in any required operating position. The camshaft with its adjusting disc and cam discs is preferably mounted in a tube in such a manner as to form a unit which may be interchangeably mounted as a whole on the valve modification of the control programme may, in this way, be effected rapidly and reliably.

The camshaft may be driven by means of a motor continuously rotating the camshaft, in which case a fluid flow reversal occurs at a rate governed by the camshaft speed which in turn is predetermined by the speed of the motor. The camshaft, however, may alternatively be subjected to a timed manual or mechanical rotation by means of a racked bar drive which is spring-loaded in one direction of movement and which has a unilaterally acting ratchet mechanism. This arrangement allows an intermittent rotation of the camshaft to be effected.

The invention will now be described further, by way of example, with reference to the accompanying drawings, in which:

FIG. 5 is a view similar to FIG. 1, also showing the actuating device for the valve members of a multi-way valve for controlling a consumer impacted on two sides; and FIGS. 6, 7, 8 and 9 respectively show a section along the lines A—A, B—B, C—C, and D—D of FIG. 5.

Figure 1:
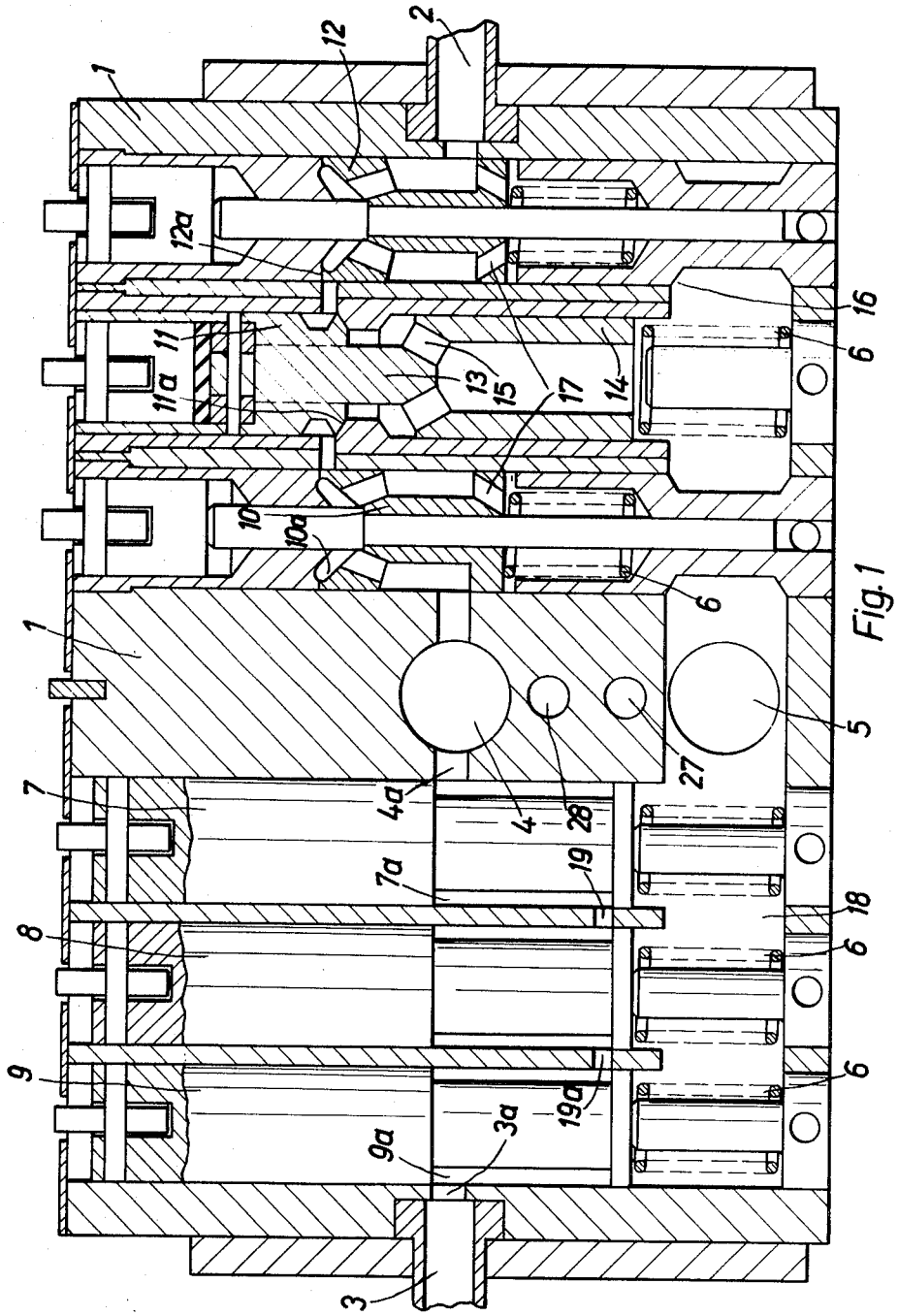
FIG. 1 is a medial section through two embodiments of a multi-way fluid control valve in accordance with the invention, particularly for controlling a consumer adapted to be impacted on two sides, the left side showing the use of valve members in the form of grooved sliders and the right side showing the use of poppet valves.

The drawings show a multi-way fluid control valve comprising a valve body 1 having connections 2 and 3 for connection to a consumer, a fluid supply connection 4 from a pump (not shown) and a return flow connection 5 to the pump. The valve body 1 has arranged therein for each fluid flow path to the connections 2, 3 two or more valve members arranged in series and independently of one another so as to be adjustable at right angles to the fluid flow path, which valve members are displaceable against the action of springs 6, by cams arranged outside the valve body.

In the embodiments of the invention shown in FIG. 1, each fluid flow path has three valve members 7 to 9 and 10 to 12 which are each adapted to be displaced between two operating positions. FIG. 1 also shows, by way of illustration, the valve members 10 to 12 being in the form of poppet valves and the valve members 7 to 9 in the form of grooved sliders. The valve seatings of the valve members 10, 11 and 12 are designated 10a, 11a and 12a respectively. The valve member 11 of the two-way valve, for improved guidance and for producing an operational engagement relative to the spring 6 by means of a valve stem 13, is provided with a hollow guide sleeve 14, the internal chamber of which communicates with the valve chamber by means of bores 15, and with a fluid collection chamber 16 communicating with the return flow connection 5. Bores 17 of the valve members 10 and 12 merely serve the production of a pressure compensation at the valve members to provide simpler adjustability without back pressure.

In the case of the fluid control being by means of grooved sliders, the arrangement is such that the valve chambers of the sliders 7, 8 and 9 are each open to a common fluid collection chamber 18 communicating with the return flow connection 5, the outer grooved sliders 7 and 9 being so formed and arranged in their valve chambers that their respective grooves 7a and 9a when in the operating position shown, may register respectively both with apertures 19 and 19a leading to the central valve chamber and with passages 4a and 3a which respectively lead to the fluid inlet pipe 4 and consumer connection 3. When for example a return flow of fluid is entering the valve through the connection 3 the fluid is ducted to the collection chamber 18 and hence through the return connection 5 to the pump, by having valve member 9 in such a position that its groove 9a communicates with both the passages 3a and 19a, while at least one of the valve members 7 or 8 is in a position clear of the passages 19 and/or 19a to permit the desired fluid flow into chamber 18.

In place of a fluid collection chamber 18 that communicates with all three valve chambers it is, however, possible, as shown in the right hand side of FIG. 1, for only the central valve chamber to communicate with the return flow connection 5.

Figure 2:
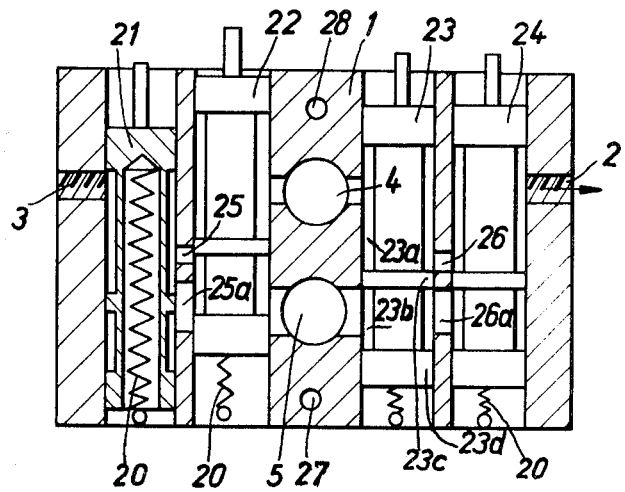
FIG. 2 is a further embodiment of a multi-way valve for controlling a consumer impacted on two sides and employing grooved sliders displaceable between three operating positions.

In the embodiment shown in FIG. 2 the valve body 1 in each fluid flow path to consumer connections 2 and 3, has provided in series connection therein two grooved sliders 23, 24 and 21, 22 respectively, these each being independently adjustable against the action of a spring 20 between three operating positions. In this embodiment each pair of valve chambers has two communicating apertures 25, 25a and 26, 26a. The groove sliders are each provided with two longitudinal grooves, for example, the grooves 23a and 23b which are separated from each other by a sealing cross-piece 23c. By means of the lower grooves 23b in combination with a lower sealing cross-piece 23d a fluid flow is obtainable. In the exemplary case the grooved sliders 21 is shown in its lower terminal position, the grooved slider 22 in its upper terminal position, and the grooved sliders 23 and 24 in their intermediate position.

Figure 3:
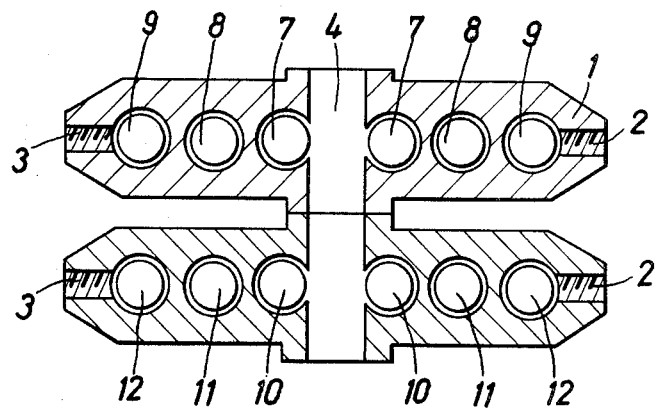
FIG. 3 is a schematic plan view of a control bank comprising two multi-way valves in accordance with the invention.

The fluid supply pipe 4 and the return pipe 5 in the embodiments shown in FIGS. 1 and 2 are arranged in parallel relationship one above the other in a direction perpendicular to the plane passing through the axes of the valve members, the fluid supply pipe 4 communicating with the valve chambers of the valve members 7, 10 and 22, 23 positioned closest thereto and the return pipe 5 communicating in a manner as described above with the collection chambers. This arrangement permits an extremely simple fluid flow within the valve body and also allows an optional number of individual valve bodies to be arranged in banks of control units without modification of the valves or without having to provide additional connections. Such a control unit is shown in FIG. 3 and comprises by way of example, two valve bodies 1 of the type shown in FIG. 1, suitable for controlling a consumer requiring to be impacted on two sides. The valve bodies may be coupled together by means of bolts passed through bores such as 27 and 28 in each valve body 1, see FIGS. 1 and 2.

Figure 4:
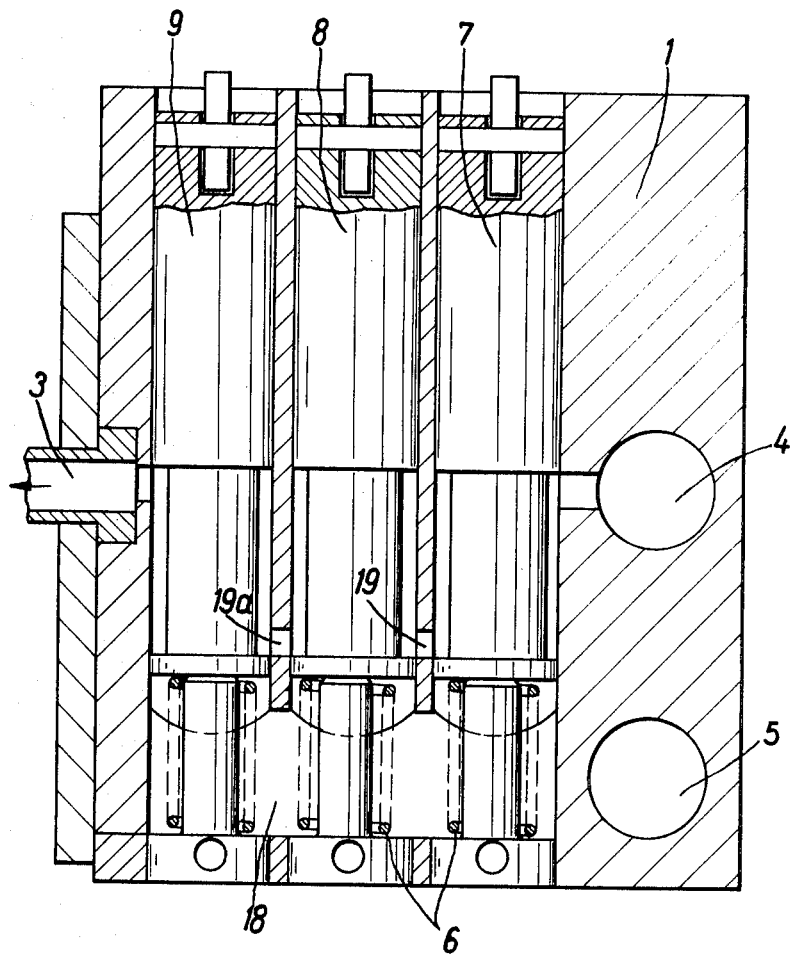
FIG. 4 shows a valve in accordance with the invention, and adapted to control a consumer requiring to be impacted on only one side.

FIG. 4 shows a further embodiment of the invention for use in connection with a consumer requiring to be impacted on one side only, for example a cylinder having a piston requiring an applied force on only one side, in which case only one pressure medium pipe for the supply and return flow to and from the consumer is provided. In this embodiment it is only necessary to have one set of valve members since there is only one pressure medium flow path corresponding with one side of the embodiments shown in FIGS. 1 and 2.

The control system obtainable with the embodiment shown in FIG. 4 may also be obtained with the valves shown in FIGS. 1 and 2 by closing one of the connections 2 or 3 or by temporarily moving one or more of the valve bodies in one flow path to a closed position. The valve shown in FIG. 4 merely presents a possible modification of the embodiments shown in FIGS. 1 and 2, the latter being applicable to a wide range of control systems.

The method of actuation of a multi-way valve in accordance with the present invention is shown in FIGS. 5 to 9 in which like parts are designated by the reference numerals. Actuation is effected by means of an interchangeably mounted camshaft 29 mounted outside the valve body 1 and provided with a cam disc 30 for each valve member, each cam disc 30 having a number of surfaces, such as 31a, 31c and 31d of FIG. 8, corresponding to the number of valve member operating positions. The cam discs are braced on the camshaft non-displaceably relative to each other by means of spacing sleeves 32 enclosing the camshaft. Bearing discs 33 may also be provided in sliding engagement with the inner wall surface of a guide tube 34 or in rolling engagement therewith by interposition of a ball bearing, whereby the camshaft 29 is retained in a satisfactory central position. An alignment disc 35 having a number of notches such as the notches 36a, 36b and 36c of FIG. 6, corresponding to the number of cam surfaces 31 of each cam disc 30 is preferably provided on the camshaft 29, the disc 35 being so positioned on the camshaft relative to the cam discs 30 that the notches are positioned to correspond with the line of action of the cam surfaces 31. The notches operationally engage with a locating pin 38 arranged on the valve body 1 and subjected to the action of a spring 37. In the example, see more particularly FIGS. 6 to 8, the locating pin 38 engages in a notch 36a, in which case the corresponding cam surfaces, such as cam surface 31a, act accordingly on their associated valve members. When rotating the camshaft until the locating pin 38 engages in the notch 36c, the cam discs 30 are also rotated therewith so that the cam surfaces corresponding with cam surface 31c act on their associated valve members 7 to 9, accordingly, whereby an alternative valve control position is assumed.

The camshaft may be driven by means of a motor continuously rotating the camshaft, in which case a fluid flow reversal occurs at a rate governed by the camshaft speed, which in turn is predetermined by the motor speed. In the example shown, however, as can be seen more particularly in FIG. 7, the camshaft is driven by a spring-loaded racked bar drive consisting of a transversely displaceable racked bar 39 and a gear pinion 40 engaging therewith, which drive is connected to the camshaft 29 by means of a single acting ratchet gear between the camshaft and the pinion 40. In this arrangement the camshaft may be actuated in timed sequence manually or mechanically, for example, by means of a pneumatic piston.

By means of the multi-way valve formed in accordance with the invention, the control programme of the valve members may be varied simply by replacing the camshaft and cam discs or the unit consisting of the camshaft and guide tube, no modification or replacement of valve members being necessary. It is not even necessary to open the valve body. Furthermore by predetermining a complete control programme on a prefabricated cam unit, faulty controls, for example, resulting from incorrect or inaccurate mounting of the cam discs, are reliably minimized. Difficult fitting operations are also minimized when modifying the control programme or when assembling the cam disc arrangement. The cam discs may be produced by stamping in a simple manner with adequate accuracy.

By means of the valves shown by way of example in FIGS. 1, 2 and 5, all control programmes necessary in operation may be carried out. In the valve shown in FIG. 1, for example, the valve members controlling the flow path to consumer connection 3 may assume a position which allows free fluid flow from the pump to the consumer, whilst the valve members controlling the flow path to consumer connection 2 may be closed to stop both the fluid supply from the pump and the return flow from the consumer. This valve member positioning allows the control valve to operate in the same manner as the embodiment shown in FIG. 4, i.e. for controlling a consumer impacted one side only. In FIG. 2, on the other hand, the valve members 23 and 24 have been positioned to allow free flow from the pump to the consumer while the valve members 21, 22 by stopping the pump supply, have been positioned to allow free flow from the consumer to the return flow connection 5. Functionally this position corresponds to the position of the three valve members shown in the embodiment of FIG. 5. Similarly, by simple mutual adjustment of the valve members by means of a suitably formed camshaft arrangement, these multi-way valves permit any desired control position.

In individual cases it is also possible to provide two valve members with two valve positions in every fluid flow path. In this case, however, not all conceivable operating positions are obtainable, especially not the control positions in which a mutual connection of all four connections is produced.

I claim:

1. A multi-way fluid control valve comprising a valve body provided with a fluid inlet connection, a fluid return connection and at least one consumer connection, and having a fluid flow path therein between the inlet connection and each consumer connection, each said fluid flow path to a consumer connection being controlled by first, second and third valve members arranged in separate valve chambers connected in series, said valve members being independently displaceable between two operative positions by means of a cam arrangement disposed outside said valve body and arranged to operate said valve members against the action of an opposite force.

2. A multi-way valve according to claim 1, wherein said valve members are each in the form of a poppet valve.

3. A multi-way valve according to claim 2, wherein said second valve member in each flow path is provided with a hollow sleeve having an internal chamber which communicates with its respective valve chamber and with said return flow connection.

4. A multi-way valve according to claim 1, wherein said valve members are each in the form of a grooved slider.

5. A multi-way valve according to claim 4, wherein at least the valve chamber of the second grooved slider of each flow path communicates with said return flow connection, the first and third grooved sliders of each flow path being so formed and arranged in their respective valve chambers that their grooves, in one operative position of said sliders, each register with an aperture communicating with the valve chamber of the second grooved slider, the groove of said first slider simultaneously registering with a further aperture communicating with said fluid supply connection and the groove of said third slider also simultaneously registering with a further aperture communicating with one of said consumer connections and, in the other operative position of said sliders, the grooves of said first and third sliders respectively register only with the further aperture communicating with said fluid supply connection and the further aperture communicating with said consumer connection.

6. A multi-way valve according to claim 5, wherein the valve chamber of each grooved slider of each fluid flow path communicates with a common fluid collection chamber communicating with said fluid return connection.

7. A multi-way valve according to claim 1, a cam shaft interchangeably mounted outside said valve body and operable to control said valve members, said cam shaft being provided with a cam disc for each valve member, each cam disc having a plurality of cam surfaces corresponding in number to the valve member operating positions, said cam shaft furthermore being provided with an alignment disc having a plurality of notches formed therein corresponding in number to the cam surfaces of each cam disc and being positioned on said cam shaft with said notches corresponding with the line of action of said cam surfaces, a spring-loaded locating pin arranged on said valve body and operable to engage said notches, and a tube housing said cam shaft and its associated cam discs and alignment discs, forming an interchangeable unit.

8. A multi-way fluid control valve comprising a valve body provided with a fluid inlet connection, a fluid return connection and at least one consumer connection, and having a fluid flow path therein between the inlet connection and each consumer connection, each said fluid flow path to a consumer connection being controlled by two valve members in the form of grooved sliders independently displaceable between three operative positions and at right angles to their fluid flow path by means of a cam arrangement disposed outside said valve body and arranged to operate said grooved sliders against the action of an opposing force, said grooved sliders each being provided with two grooves and being arranged in separate valve chambers connected in series by two communications passages.

References Cited

UNITED STATES PATENTS

| | | | |
|---|---|---|---|
| 3,000,397 | 9/1961 | Schmiel | 137—596.13 |
| 2,436,425 | 2/1948 | Fioretta | 137—596.2 XR |
| 2,425,380 | 8/1947 | Livers | 137—106 |
| 1,387,831 | 8/1921 | Bochert et al. | 137—596 XR |
| 3,059,482 | 10/1962 | Petzoldt | 74—568 XR |
| 3,289,701 | 12/1966 | Booth et al. | 137—596 XR |
| 3,331,254 | 7/1967 | Stoll | 74—568 XR |
| 3,372,708 | 3/1968 | Hotchkin | 74—568 XR |

FOREIGN PATENTS

| | | |
|---|---|---|
| 618,941 | 9/1935 | Germany. |
| 548,175 | 9/1942 | Great Britain. |
| 603,782 | 6/1948 | Great Britain. |

HENRY T. KLINKSIEK, Primary Examiner